US011438956B2

(12) United States Patent
Tseng et al.

(10) Patent No.: US 11,438,956 B2
(45) Date of Patent: Sep. 6, 2022

(54) METHOD OF SIDELINK UNICAST SERVICE MANAGEMENT IN ACCESS STRATUM LAYER AND RELATED DEVICE

(71) Applicant: FG Innovation Company Limited, Tuen Mun (HK)

(72) Inventors: Yung-Lan Tseng, Hsinchu (TW); Hung-Chen Chen, Hsinchu (TW); Mei-Ju Shih, Hsinchu (TW); Yu-Hsin Cheng, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 30 days.

(21) Appl. No.: 16/865,046

(22) Filed: May 1, 2020

(65) Prior Publication Data

US 2020/0351975 A1     Nov. 5, 2020

Related U.S. Application Data

(60) Provisional application No. 62/842,195, filed on May 2, 2019.

(51) Int. Cl.
*H04W 76/27*     (2018.01)
*H04L 5/00*     (2006.01)
*H04W 92/18*     (2009.01)

(52) U.S. Cl.
CPC ............. *H04W 76/27* (2018.02); *H04L 5/001* (2013.01); *H04L 5/0051* (2013.01); *H04L 5/0092* (2013.01); *H04W 92/18* (2013.01)

(58) Field of Classification Search
CPC ..... H04W 76/27; H04W 92/18; H04W 76/19; H04W 76/23; H04W 76/20; H04W 24/10;
(Continued)

(56) References Cited

U.S. PATENT DOCUMENTS

2017/0041818 A1    2/2017   Lee et al.
2020/0163005 A1*   5/2020   Rao ........................ H04W 76/14
(Continued)

FOREIGN PATENT DOCUMENTS

CN     106793109 A     5/2017
WO    2018137452 A1    8/2018

OTHER PUBLICATIONS

Vivo, "Sidelink unicast procedures in NR", 3GPP TSG-RAN WG2 Meeting #104, R2-1817108, Nov. 2, 2018 Nov. 2, 2018), Section 2 (Year: 2018).*

(Continued)

*Primary Examiner* — Hardikkumar D Patel
(74) *Attorney, Agent, or Firm* — ScienBiziP, P.C.

(57) ABSTRACT

A method of sidelink unicast service management in an access stratum layer for a first user equipment (UE) is disclosed. The method comprises receiving, by the first UE through a PC5 interface, a sidelink unicast configuration (Continued)

associated with a second UE, from the second UE, transmitting, by the first UE through a radio resource control, RRC, signaling of the PC5 interface, a sidelink unicast link problem report, to the second UE in responsive to that the first UE is unable to comply with all or part of the sidelink unicast configuration, and performing, by the first UE, a sidelink unicast fallback procedure with the second UE by continuously using a sidelink unicast configuration setting of the first UE with corresponding configurations in a sidelink unicast pre-configuration used prior to the received sidelink unicast configuration.

15 Claims, 10 Drawing Sheets

(58) Field of Classification Search
CPC . H04W 36/0055; H04W 36/08; H04W 76/11; H04W 76/30; H04W 88/023; H04W 48/20; H04W 36/0072; H04W 76/14; H04W 76/34; H04W 4/40; H04W 36/0011; H04L 5/001; H04L 5/0051; H04L 5/0092; H04L 5/0053; H04L 5/0055; H04L 5/0057
See application file for complete search history.

(56) References Cited

U.S. PATENT DOCUMENTS

2020/0229262 A1\* 7/2020 Jung ................. H04W 36/08
2021/0176747 A1\* 6/2021 Yang ................. H04L 5/0044

OTHER PUBLICATIONS

Oppo, "Summary of [104#55][NR/V2X] Unicast (Oppo)" 3GPP TSG-RAN WG2 Meeting #105, R2-1900180, Feb. 15, 2019(Feb. 15, 2019), Sections 2.1 and 2.2.
Apple, "Summary of [104#56] [NR/V2X] AS Level Link Management for Unicast (Apple)" 3GPP TSG-RAN WG2 Meeting #105, R2-1901900, Feb. 15, 2019(Feb. 15, 2019), the whole document.
Vivo, "Sidelink unicast procedures in NR", 3GPP TSG-RAN WG2 Meeting #104, R2-1817108, Nov. 2, 2018 (Nov. 2, 2018), Section 2.
Intel Corporation, "Offline Summary for NR-V2X Agenda Item—7.2.4.1.4 Resource Allocation Mechanism", 3GPP TSG RAN WG1 Meeting #94, R1-1809867, Aug. 23, 2018(Aug. 23, 2018), the whole document A.
NTT Docomo, Inc., "Resource allocation mechanism" 3GPP TSG RAN WG1 Meeting #94, R1-1809159, Aug. 10, 2018(Aug. 10, 2018), the whole document.

\* cited by examiner

METHOD OF SIDELINK UNICAST SERVICE
MANAGEMENT IN ACCESS STRATUM
LAYER AND RELATED DEVICE

CROSS-REFERENCE TO RELATED APPLICATION(S)

The present disclosure claims the benefit of and priority to U.S. provisional Patent Application Ser. No. 62/842,195 filed on May 2, 2019, entitled "Sidelink Unicast Service Management in Access Stratum Layer," (hereinafter referred to as "the '195 provisional"). The disclosure of the '195 provisional is hereby incorporated fully by reference into the present disclosure.

FIELD

The present disclosure generally relates to wireless communications, and more particularly, to a method of sidelink unicast service management in access stratum layer and a related device.

BACKGROUND

In the sidelink unicast scenario, both of the paired user equipments (UEs) (e.g., UE #1 and UE #2) may be formulated in the upper layers (e.g., by application layers, such as vehicle-to-everything (V2X) layer) through control signaling protocols (e.g., PC5-S protocols, which define direct communication between V2X uses above access stratum) for sidelink unicast service. However, in the conventional V2X service, the UEs are considered as "connection-less" in the access stratum (AS) layer, which means there is no efficient mechanisms to monitor and manage the AS layer link quality in the sidelink unicast scenario (in comparison with radio resource control (RRC) connection of Uu interface (a radio interface between the UE and radio access network (RAN) in access stratum) in new radio (NR)/long term evolution (LTE) protocols).

FIG. 1 illustrates sidelink unicast scenario in multiple component carriers on PC5 interface. Both of the paired UEs may be configured with one or more than one component carriers for at least one sidelink unicast service. The paired UEs may obtain configuration for one (or more than one) component carrier through a sidelink pre-configuration. In other examples, the UE may obtain configuration for multiple component carriers through control signaling (e.g., a dedicated RRC signaling or broadcasting system information from serving cell(s) through Uu interface).

In addition, the paired UEs may exchange control signaling (e.g., UEs may exchange UE capability on supporting frequency carriers or sidelink reference signal receiving power (SL-RSRP)/Channel Busy Ratio (CBR) measurements results through PC5 RRC signaling) to determine the configuration for multiple component carriers.

Moreover, the operating component carriers may be additionally determined based on measurements between the paired UEs. For example, the UEs may obtain a list of candidate component carriers for SL-unicast service through a sidelink pre-configuration, broadcasting message/dedicated control signaling from serving RAN, or from the dedicated control signaling transmitted by its paired UE. Thus, both of the UEs may implement measurements on (part of) the candidate component carriers in the candidate list. The paired UEs may further determine operating component carrier(s) based on their measurement results through the control signaling exchange between each other (e.g., through the PC5 RRC signaling in PC5 interface). In other examples, the operating component carriers may be determined by the serving RAN, so both of the UEs may need to provide their measurement results to the serving RAN respectively through dedicated control signaling (e.g., RRC signaling in the Uu interface).

In the sidelink unicast scenario, the paired UEs may be grouped as the SL-unicast group {UE #1, UE #2} under in-coverage, out-of-coverage, or partial-coverage implementation.

In-Coverage Case:

Both of the paired UEs may be under the coverage of a RAN. The SL-unicast group {UE #1, UE #2} may be served by the same cell or be served by different cells in the RAN. In one implementation, both of the serving cells may have direct backhaul connection with each other. In some implementations, both of the serving cells may exchange information through the assistance of a core network (CN) (e.g., through intra-system (within the same evolved packet core (EPC)) or inter-system signaling exchange (e.g., between EPC and 5GC)). Both of the in-coverage UEs may obtain sidelink unicast configurations from the serving cell(s) to construct the PC5 interface with each other. The sidelink unicast configurations may be provided by cell-specific broadcasting system information or by dedicated control signaling (e.g., RRC signaling, such as an RRC(Connection) Setup message, RRC(Connection)Reconfiguration message, RRC(Connection)Resume message or RRC(Connection) Release message, in the Uu interface). In other implementations, both of the in-coverage UEs would exchange control signaling (e.g., through PC5 RRC protocols on PC5 interface) to negotiate the sidelink unicast configuration during or after the SL-unicast group {UE #1, UE #2} is established by the upper layers (e.g., through PC5-S protocols in the upper layers).

Out-of-Coverage Case:

Both of the paired UEs may be out of the coverage from the RAN. In this implementation, one UE may implement sidelink unicast service based on the configurations which are pre-configured (e.g., stored in a Universal Mobile Telecommunication System (UMTS) Subscriber Identity Module (USIM) of the UE or through the last serving cell which the UE has accessed before the UE moved out of the coverage of RAN), which is also called the sidelink pre-configuration in this disclosure In some implementations, both of the out-of-coverage UEs may exchange control signaling (e.g., through PC5 RRC protocols) to negotiate the sidelink unicast configuration during or after the SL-unicast group is established by the upper layers (e.g., through PC5-S protocols in the upper layers).

Partial-Coverage Case:

One of the paired UEs is out of the coverage from a RAN and another UE is under the coverage of the RAN. In one implementation, the in-coverage UE would implement sidelink unicast service based on the sidelink unicast configuration received from the serving cell. In contrast, to the out-of-coverage UE, the UE may implement sidelink unicast service based on the sidelink pre-configuration.

In other implementations, out-of-coverage UEs may obtain the sidelink unicast configuration, which is configured by the serving cell of the in-coverage UE, through the relaying of in-coverage UE. In this case, the paired UEs may negotiate with each other directly to determine the sidelink unicast configuration. Therefore, both of the UEs implement sidelink unicast service based on negotiated sidelink unicast configuration.

However, there is no specification for sidelink unicast configuration application for sidelink unicast service when a sidelink unicast link problem or sidelink unicast link failure occurs in one (or more than one) component carrier on PC5 interface.

SUMMARY

The present disclosure is directed to a method of sidelink unicast service management in an access stratum layer and a related device.

According to an aspect of the present disclosure, a method of sidelink unicast service management in an access stratum layer for a first user equipment (UE) is disclosed. The method comprises receiving, by the first UE through a PC5 interface, a sidelink unicast configuration associated with a second UE, from the second UE, transmitting, by the first UE through a Radio Resource Control (RRC) signaling of the PC5 interface, a sidelink unicast link problem report, to the second UE in responsive to that the first UE is unable to comply with all or part of the sidelink unicast configuration, and performing, by the first UE, a sidelink unicast fallback procedure with the second UE by continuously using a sidelink unicast configuration setting of the first UE with corresponding configurations in a sidelink unicast pre-configuration used prior to the received sidelink unicast configuration.

According to another aspect of the present disclosure, a method of sidelink unicast service management in an access stratum layer for a second user equipment (UE) is disclosed. The method comprises transmitting, by the second UE through a PC5 interface, a sidelink unicast configuration to a first UE, receiving, by the second UE through a first Radio Resource Control (RRC) signaling of the PC5 interface, a first sidelink unicast link problem report, from the first UE, and performing, by the second UE, a sidelink unicast fallback procedure with the first UE by continuously using a sidelink unicast configuration setting of the second UE with corresponding configurations in a sidelink unicast pre-configuration used prior to the transmitted sidelink unicast configuration.

According to another aspect of the present disclosure, a first user equipment (UE) in a wireless communication system is disclosed. The first UE comprises a processor, for executing computer-executable instructions, and a non-transitory machine-readable medium, coupled to the processor, for storing the computer-executable instructions, wherein the computer-executable instructions instruct the processor to receive, by the first UE through a PC5 interface, a sidelink unicast configuration associated with a second UE, from the second UE, transmit, by the first UE through a Radio Resource Control (RRC) signaling of the PC5 interface, a sidelink unicast link problem report, to the second UE in responsive to that the first UE is unable to comply with all or part of the sidelink unicast configuration, and perform, by the first UE, a sidelink unicast fallback procedure with the second UE by continuously using a sidelink unicast configuration setting of the first UE with corresponding configurations in a sidelink unicast pre-configuration used prior to the received sidelink unicast configuration.

According to another aspect of the present disclosure, a second user equipment (UE) in a wireless communication system is disclosed. The second UE comprises a processor, for executing computer-executable instructions, and a non-transitory machine-readable medium, coupled to the processor, for storing the computer-executable instructions, wherein the computer-executable instructions instruct the processor to transmit, by the second UE through a PC5 interface, a sidelink unicast configuration to a first UE, receive, by the second UE through a first Radio Resource Control (RRC) signaling of the PC5 interface, a first sidelink unicast link problem report, from the first UE, and perform, by the second UE, a sidelink unicast fallback procedure with the first UE by continuously using a sidelink unicast configuration setting of the second UE with corresponding configurations in a sidelink unicast pre-configuration used prior to the transmitted sidelink unicast configuration.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

DETAILED DESCRIPTION

Figure 1:
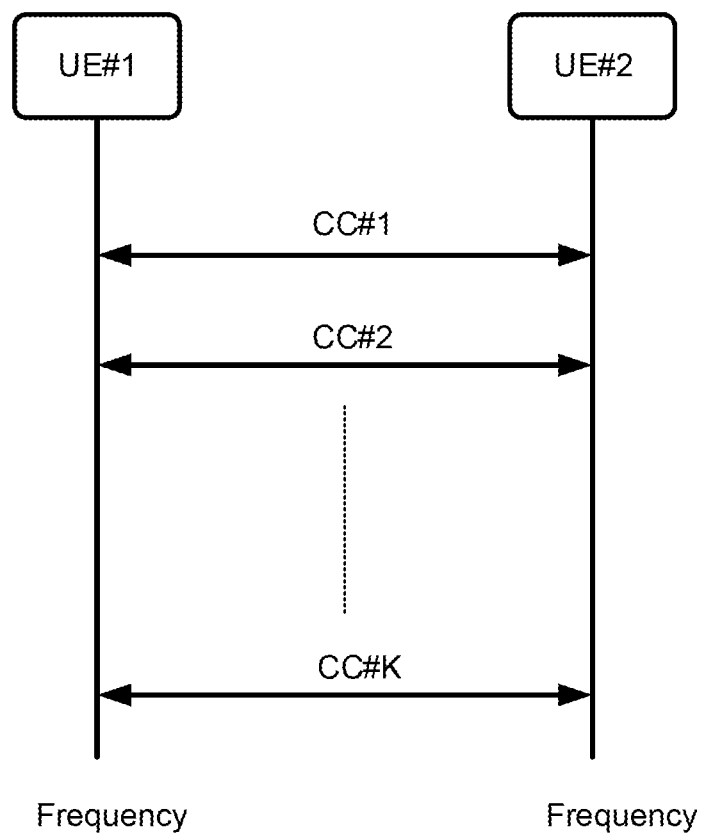
FIG. 1 is a schematic diagram illustrating a sidelink unicast in multiple component carriers on a PC5 interface, in accordance with related art methods.

The following description contains specific information pertaining to exemplary implementations in the present disclosure. The drawings and their accompanying detailed description are directed to exemplary implementations. However, the present disclosure is not limited to these exemplary implementations. Other variations and implementations of the present disclosure will occur to those skilled in the art. Unless noted otherwise, like or corresponding elements in the figures may be indicated by like or corresponding reference numerals. Moreover, the drawings and illustrations are generally not to scale and are not intended to correspond to actual relative dimensions.

For consistency and ease of understanding, like features are identified (although, in some examples, not shown) by numerals in the exemplary figures. However, the features in different implementations may be different in other respects, and therefore shall not be narrowly confined to what is shown in the figures.

The phrases "in one implementation," and "in some implementations," may each refer to one or more of the same or different implementations. The term "coupled" is defined as connected, whether directly or indirectly via intervening components, and is not necessarily limited to physical connections. The term "comprising" means "including, but not necessarily limited to" and specifically indicates open-ended inclusion or membership in the described combination, group, series, and equivalents.

Additionally, any two or more of the following paragraphs, (sub)-bullets, points, actions, behaviors, terms, alternatives, examples, or claims described in the following disclosure may be combined logically, reasonably, and properly to form a specific method. Any sentence, paragraph, (sub)-bullet, point, action, behaviors, terms, or claims described in the following disclosure may be implemented independently and separately to form a specific method. Dependency, e.g., "based on", "more specifically", "preferably", "In one embodiment", "In one implementation", "In one alternative" etc., in the following disclosure refers to just one possible example which would not restrict the specific method.

For explanation and non-limitation, specific details, such as functional entities, techniques, protocols, and standards are set forth for providing an understanding of the described technology. In other examples, detailed description of well-known methods, technologies, system, and architectures are omitted so as not to obscure the description with unnecessary details.

Persons skilled in the art will recognize that any described network function(s) or algorithm(s) may be implemented by hardware, software, or a combination of software and hardware. Described functions may correspond to modules that are software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of applications specific integrated circuitry (ASIC), programmable logic arrays, and/or using one or more digital signal processor (DSPs). Although some of the disclosed implementations are directed to software installed and executing on computer hardware, alternative implementations as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc (CD) read-only memory (CD ROM), magnetic cassettes, magnetic tape, magnetic disk storage, or any other equivalent medium capable of storing computer-readable instructions.

A radio communication network architecture (e.g., a long term evolution (LTE) system, an LTE-Advanced (LTE-A) system, an LTE-A Pro system, or an New Radio (NR) system typically includes at least one base station (BS), at least one UE, and one or more optional network elements that provide connection with a network. The UE communicates with the network (e.g., a core network (CN), an evolved packet core (EPC) network, an Evolved Universal Terrestrial Radio Access Network (RAN) (E-UTRAN), a Next-Generation (GN) Core (NGC), 5G CN (5GC), or an internet via a RAN established by the BS.

It should be noted that, in the present disclosure, a UE may include, but is not limited to, a mobile station, a mobile terminal or device, a user communication radio terminal. For example, a UE may be a portable radio equipment, that includes, but is not limited to, a mobile phone, a tablet, a wearable device, a sensor, or a personal digital assistant (PDA) with wireless communication capability. The UE is configured to receive and transmit signals over an air interface to one or more cells in a RAN.

ABS may include, but is not limited to, a node B (NB) as in the UMTS, an evolved node B (eNB) as in the LTE-A, a radio network controller (RNC) as in the UMTS, a BS controller (BSC) as in the Global System for Mobile communications (GSM)/GSM Enhanced Data rates for GSM Evolution (EDGE) RAN (GERAN), an Next Generation (NG)-eNB as in an Evolved Universal Terrestrial Radio Access (E-UTRA) BS in connection with the 5GC, a next generation node B (gNB) as in the 5G-RAN, and any other apparatus capable of controlling radio communication and managing radio resources within a cell. The BS may connect to serve the one or more UEs via a radio interface to the network.

A BS may be configured to provide communication services according to at least one of the following radio access technologies (RATs): Worldwide Interoperability for Microwave Access (WiMAX), GSM (often referred to as 2G), GERAN, General Packet Radio Service (GRPS), UMTS (often referred to as 3G) according to basic wideband-code division multiple access (W-CDMA), high-speed packet access (HSPA), LTE, LTE-A, evolved LTE (eLTE), New Radio (NR, often referred to as 5G), and/or LTE-A Pro. However, the scope of the present disclosure should not be limited to these protocols.

The BS is operable to provide radio coverage to a specific geographical area using a plurality of cells forming the RAN. The BS supports the operations of the cells. Each cell is operable to provide services to at least one UE within radio coverage of the cell. More specifically, each cell (often referred to as a serving cell) provides services to serve one or more UEs within the cell's radio coverage, (e.g., each cell schedules the downlink (DL) and optionally uplink (UL) resources to at least one UE within the cell's radio coverage for DL and optionally UL packet transmissions). The BS can communicate with one or more UEs in the radio communication system via the plurality of cells. A cell may allocate sidelink (SL) resources for supporting proximity service (ProSe), LTE sidelink service, and LTE/NR V2X services. Each cell may have overlapped coverage areas with other cells.

Figure 2:
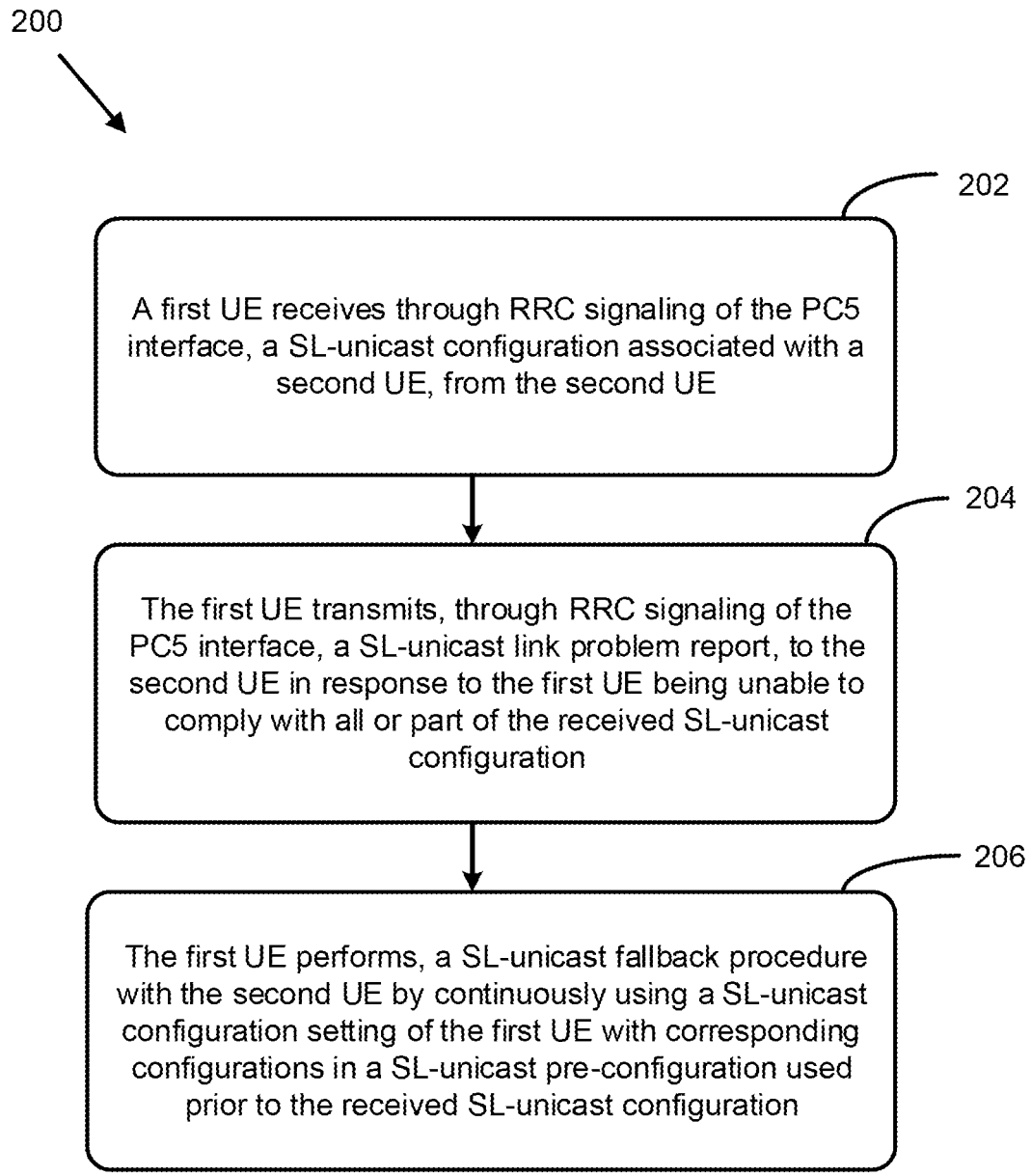
FIG. 2 is a flowchart illustrating a sidelink unicast service management, in accordance with example implementations of the present disclosure.

FIG. 2 illustrates a method 200 for paired UEs to perform SL-unicast service management according to the present disclosure. In action 202, the first UE receives through (LTE and/or NR) PC5 interface, a SL-unicast configuration associated with a second UE, from the second UE. In action 204, the first UE transmits, through a RRC signaling of the PC5 interface, a SL-unicast link problem report, to the second UE in response to the first UE being unable to comply with all or part of the SL-unicast configuration received in action 202. In action 206, the first UE performs, a SL-unicast fallback procedure with the second UE by continuously using a SL-unicast configuration setting of the first UE with corresponding configurations in a SL-unicast pre-configuration used prior to the received SL-unicast configuration.

The method 200 achieves that the UE applies the SL-unicast pre-configuration for the SL-unicast fallback procedure when the SL-unicast link problem occurs. For example, the UE transmitting the SL-unicast link problem report to the paired UE performs the SL-unicast fallback procedure with the SL-unicast pre-configuration, and/or the paired UE that received the SL-unicast link problem report from the UE performs the SL-unicast fallback procedure with the SL-unicast pre-configuration. The SL-unicast pre-configuration is pre-stored in the UE (e.g., stored in the USIM or in the memory module), and is received from a serving cell of the UE or from a previous serving cell of the UE, or is received from the paired UE prior to the reception/transmission of the SL-unicast configuration. More specifically, the SL-unicast pre-configuration includes at least one of SL radio bearer (RB) configurations, SL component carrier configurations, SL reference signal configurations and SL bandwidth part (BWP) configurations.

SL-unicast link problem and SL-unicast failure may occur in SL-unicast service. For example, a SL-unicast link problem may happen to one or part of the component carriers among the paired UE. The SL-unicast group UEs may implement SL-unicast service through another part of the reliable component carriers, which are not impacted by the SL-unicast link problem. In addition, if all of the operating component carriers fail (also includes the case that there is only one operating component carrier between the paired UEs), this scenario may be regarded as SL-unicast failure event.

Triggering Implementation of SL-Unicast Link Problem

In some cases, UE may consider that one component carrier has an SL-unicast link problem based on the channel condition. For example, the following causes may be reported based on the UE's observation in Layer-1 (e.g., the Physical Layer). Table 1 includes causes of an SL-unicast link problem and the corresponding UE behavior.

TABLE 1

| Cause | Definition and UE behavior |
|---|---|
| Cause A | (1) Beam failure event happens on the sync. source (e.g., a serving cell or a SyncRef UE) of the corresponding component carrier CC#1-CC#K.<br>(2) UE would monitor the broadcasting reference signalling (e.g., synchronisation signal block (SSB), channel state information reference signal (CSI-RS), demodulation reference signal (DMRS) in Uu interface or SL SSB, SL CSI-RS, SL DMRS in PC5 interface) of the synchronization source for beam management.<br>(3) The serving cell may be Primary Cell (PCell), Primary Secondary Cell (PSCell), or Secondary Cell (SCell) to an RRC Connected UE or a suitable (or acceptable) cell to an RRC idle/inactive UE.<br>(4) The corresponding UE may report cause = "beam failure on sync source" (with the corresponding component carrier identifier) on the SL-unicast link problem report.<br>In this scenario, the corresponding UE may perform the following during the following SL-unicast re-configuration procedure (w/wo the coordination of serving RAN):<br>a) modify its sidelink beamforming configuration with the corresponding synchronization source (e.g., try to find other candidate beams or fallback to the sidelink pre-configuration); or |

TABLE 1-continued

| Cause | Definition and UE behavior |
|---|---|
| | b) change the synchronization source in the corresponding frequency; or<br>c) remove the corresponding frequency from the operating component carriers (with the paired UE). |
| Cause A-1 | (1) The reference signaling quality (e.g., Reference Signal Receiving Property (RSRP) or Reference Signal Receiving Quality (RSRQ) of Reference Signal(s) on Uu interface (e.g., SSB or CSI-RS) or PC5 interface (e.g., SL-SSB, SL CSI-RS, SL DMRS)) that the UE receives from the synchronization source (e.g., a serving cell or a SyncRef UE) of the corresponding component carrier is lower than a threshold.<br>(2) UE would monitor the broadcast reference signalling (e.g., SSB, CSI-RS, DMRS or SL-SSB, SL CSI-RS, SL DMRS) of the synchronization source for beam management.<br>(3) The serving cell may be a PCell, PSCell, or SCell to an RRC Connected UE or a suitable cell to an RRC idle/inactive UE.<br>The UE may report cause = "Poor channel quality with sync source" (with the corresponding component carrier identifier) on the SL-unicast link problem report.<br>In this scenario, the corresponding UE may during the following SL-unicast re-configuration procedure (w/wo the coordination of serving RAN):<br>a) Start to monitor additional reference signals (e.g., DMRS/SL-DMRS or PT-RS) transmitted by the corresponding sync. source; or<br>b) change the synchronization source in the corresponding frequency; or<br>c) remove the corresponding frequency from the operating component carriers (with the paired UE). |
| Cause B | (1) Beam failure event happens to the paired UE.<br>(2) UE would monitor the broadcasting reference signaling (e.g., SL-SSB, SL CSI-RS, SL DMRS, SL phase tracking reference signal (PT-RS)) of the paired UE (on PC5 interface) for beam management.<br>(3) The paired UE may not be the SyncRef UE to the corresponding UE.<br>(4) UE may report cause = "beam failure on paired UE" on the SL-unicast link problem report.<br>In this scenario, the corresponding UE may with the paired UE during the following SL-unicast re-configuration procedure (w/wo the coordination of serving RAN):<br>a) Modify its SL beamforming configuration (e.g., try to find other candidate beams or request the paired UE to modify their SL beamforming configuration); or<br>b) remove the corresponding frequency from the operating component carriers. |
| Cause B-1 | (1) The reference signaling quality (e.g., SL-RSRP, SL-RSRQ on PC5 interface) that the UE receives from the paired UE on either CC#1-CC#K is lower than a threshold.<br>(2) UE would monitor the broadcasting reference signaling (e.g., SL DMRS, SL-SSB, SL CSI-RS) of the paired UE (on PC5 interface).<br>(3) The paired UE may not be the SyncRef UE to the corresponding UE.<br>(4) The UE may report cause = "Poor channel quality with the paired UE" on the SL-unicast link problem report.<br>In this scenario, the corresponding UE may with the paired UE during the following SL-unicast re-configuration procedure (w/wo the coordination of serving RAN):<br>a) Start to monitor additional reference signals (e.g., SL-SSB, SL CSI-RS, DMRS or PT-RS on the corresponding component carrier or in other operating component carriers) transmitted by another UE; or |

TABLE 1-continued

| Cause | Definition and UE behavior |
|---|---|
| | b) Adjust the transmission power on SL packet delivery accordingly on the corresponding component carrier (e.g., open-loop power control); or |
| | c) remove the corresponding frequency from the operating component carriers. |
| Cause C | (1) CBR (Channel Busy Ratio) in the corresponding frequency carrier is higher than a pre-defined threshold. |
| | (2) UE would monitor the SL resource pools on the corresponding frequency to derive the estimated CBR. |
| | (3) The UE may report cause = "CBR higher than a threshold" on the SL-unicast link problem report. |
| | In this scenario, the corresponding UE may with the paired UE during the following SL-unicast re-configuration procedure (w/wo the coordination of serving RAN): |
| | a) Adjust the configured "allowed component carriers" of (at least) one SL-RB (e.g., remove the corresponding component carrier and/or add another component carrier into the allowed component carriers); or |
| | b) Remove the corresponding frequency from the operating component carriers. |

The UE may report the SL-unicast link problem report while the problem happens in the Layer-2 (e.g., Service Data Adaptation Protocol (SDAP)/Packet Data Convergence Protocol (PDCP)/Radio Link Control (RLC)/Medium Access Control (MAC) layer in PC5 interface) or in the Layer-1 in the PC5 interface.

In the SL-unicast link problem report, the UE may further indicate the component carrier ID(s) with the indicated air link problem, to the paired UE according to the UE identification/identifier (ID) (e.g., a Layer-2 Destination ID of the paired UE).

Figure 3A:
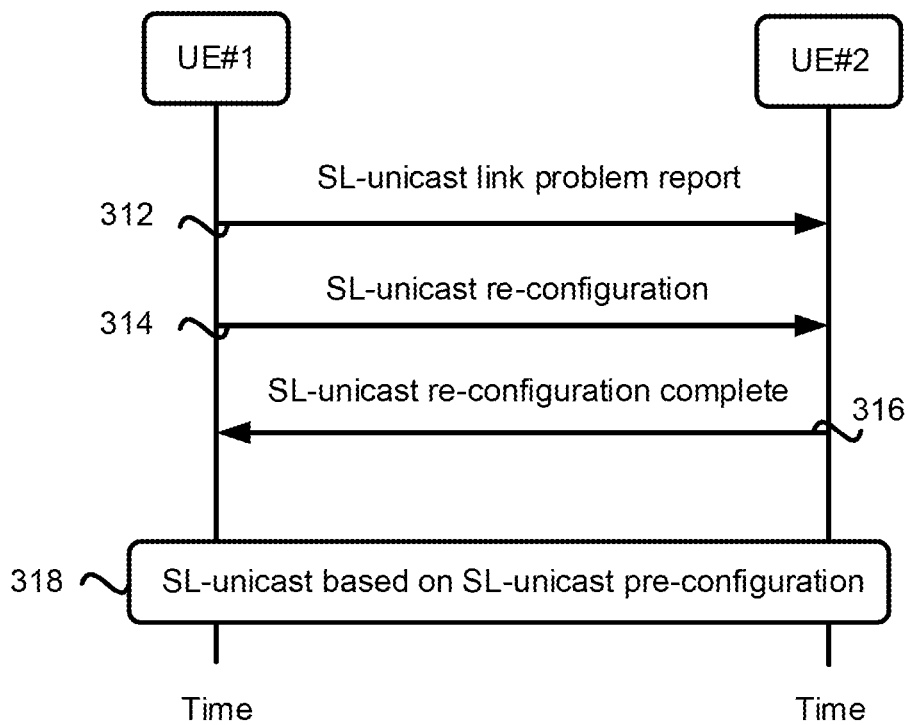
FIG. 3A and FIG. 3B are schematic diagrams illustrating a signaling transmission between paired UEs, in accordance with example implementations of the present disclosure.
Figure 3B:
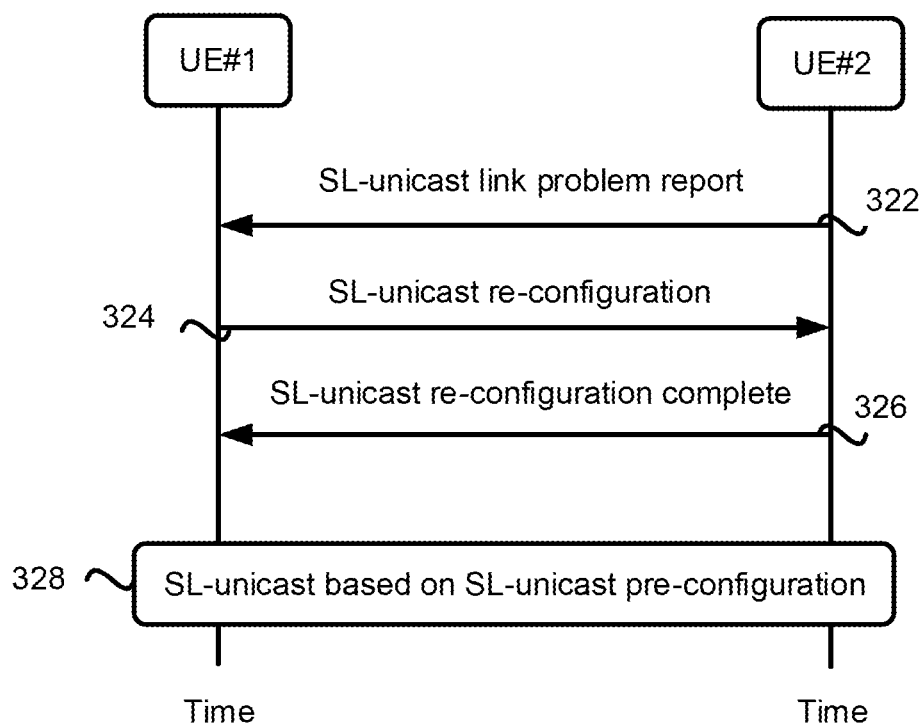

The paired UE ID (e.g., a Layer-2 Destination ID of the paired UE) may be used if the target recipient of the SL-unicast link problem report is the serving cell of the UE. The SL-unicast group UEs may have an SL-unicast link problem on the component carrier CC #K. In one implementation, the SL-unicast link problem may be triggered by the SL-unicast group UEs being unable to comply with all or part of the SL-unicast configuration on the component carrier CC #K. On the other hand, the SL-unicast group UEs can still exchange SL packets on the component carriers CC #1-CC #K-1. Thus, the SL-unicast group UEs may report the SL-unicast link problem (regarding the component carrier CC #K) to the paired UE through other available component carriers (e.g., the component carriers CC #1-CC #K-1). In some other cases, the SL-unicast group UEs may have SL-unicast link problem on the SL Layer-2/Layer-1 configurations (e.g., the SL-unicast configuration in SDAP/PDCP/RLC/MAC/PHY sub-layers in either UE #1 or UE #2) and the UEs may exchange packets only on the component carrier CC #K. In one implementation, the SL-unicast link problem may be triggered while the SL-unicast group UEs is unable to comply with all or part of the SL-unicast configuration. Even so, the SL-unicast group UEs may still exchange SL packets on the component carriers CC #K (e.g., based on the SL-unicast pre-configuration stored by the UE #1 and UE #2 respectively before the SL-unicast link problem happens). With reference to FIGS. 3A-3B, the UE #1 sends SL-unicast link problem to the UE #2 (e.g., action 312), or the UE #2 sends SL-unicast link problem to the UE #1 (e.g., action 322). It is noted that one of the paired UEs detects the SL-unicast link problem earlier than another UE (e.g., UE #2 may send a SL-unicast configuration through PC5-RRC signaling to the UE #1 to re-configure the SL AS configurations between the UE #1 and UE #2. However, the SL-unicast configuration transmitted by the UE2 is not applicable to the UE #1. In this condition, UE #1 may detect the SL-unicast link problem earlier than the UE #2, and then the UE #1 may report the SL-unicast link problem to another UE (e.g., the UE #2). So, the UE #1 may continue using the SL-unicast pre-configuration stored by the UE #1 itself prior to sending the SL-unicast link problem report to the UE #2 (e.g., action 318). On the other hand, the UE #2 may continue using the SL-unicast pre-configuration, which is stored by the UE #2 itself prior to sending the SL-unicast re-configuration message, after receiving the SL-unicast link problem report from the UE #1 (e.g., action 328). The UE #1 and UE #2 may obtain their SL-unicast pre-configuration from the serving cell(s), or from the peer UE in the same SL-unicast group, or from the SL pre-configuration. Moreover, it is also worthy to note that the UE #1/UE #2 may obtain their SL-unicast pre-configuration from the same source or from different sources.

The SL-unicast re-configuration procedure between the SL-unicast group UEs may be triggered to (re)-configure the SL AS configuration between the SL-unicast group UEs with/without the transmission/reception of SL-unicast link problem report (e.g., actions 314, 316, 324 and 326). In some implementations, the SL-unicast link problem report may be transmitted with the SL-unicast re-configuration procedure in one signaling (e.g., the SL-unicast re-configuration message) or the SL-unicast re-configuration message may be transmitted directly without the SL-unicast link problem report. For example, one UE (a first UE) may send an SL-unicast re-configuration message to a second UE to remove the component carrier CC #K from the SL-unicast service after the first UE detects the SL-unicast link problem on the component carrier CC #K. Thus, the second UE may remove the component carrier CC #K from the component carrier list and then reply the SL-unicast re-configuration complete to the first UE.

In some implementations, the first UE or the second UE may remove the component carrier CC #K from the SL-unicast service at one of the following conditions:

(1) after the first UE detects the SL-unicast link problem; or (2) after sending the SL-unicast re-configuration; or (3) after receiving the SL-unicast re-configuration complete from the second UE.

Besides removing the corresponding component carrier from the component carrier list (e.g., the component carrier CC #K in this case), the paired UEs may negotiate to modify part of the SL-unicast configurations on the corresponding component carrier (e.g., releasing the SL beamforming (transmitting (or transmission) (TX)/receiving (or reception) (RX)) configuration on the corresponding component carrier or removing the corresponding component carrier as an "allowed component carrier" for the SL packet delivery on one SL logical channel).

As shown in FIGS. 3A and 3B, signaling transmission between the paired UEs are exchanged by dedicated control signaling (e.g., PC5 RRC signaling). In physical channels, the SL-unicast link problem report and the SL-unicast re-configuration may be transmitted on physical SL feedback channel (PSFCH), physical sidelink control channel (PSCCH), or physical sidelink shared channel (PSSCH). The signaling flow in FIGS. 3A and 3B may be applicable to the in-coverage, out-of-coverage, and partial-coverage scenario. In some implementations, only the "Group Leader" (e.g., UE #1 of FIGS. 3A and 3B) of the SL-unicast group (e.g., {UE #1, UE #2}) could trigger the SL-unicast re-configuration procedure (e.g., send the SL-unicast re-configuration message). In other implementations, the "Group Leader" of the SL-unicast group may send an SL-unicast re-configuration message without the reporting from the group member (e.g., the UE #2 of FIGS. 3A and 3B). The "Group Leader" in the SL-unicast group may be determined by the signaling exchange in upper layers (e.g., the PC5 signaling protocols) or by UEs in AS layers protocols (e.g., PC5 RRC signaling).

Figure 4:
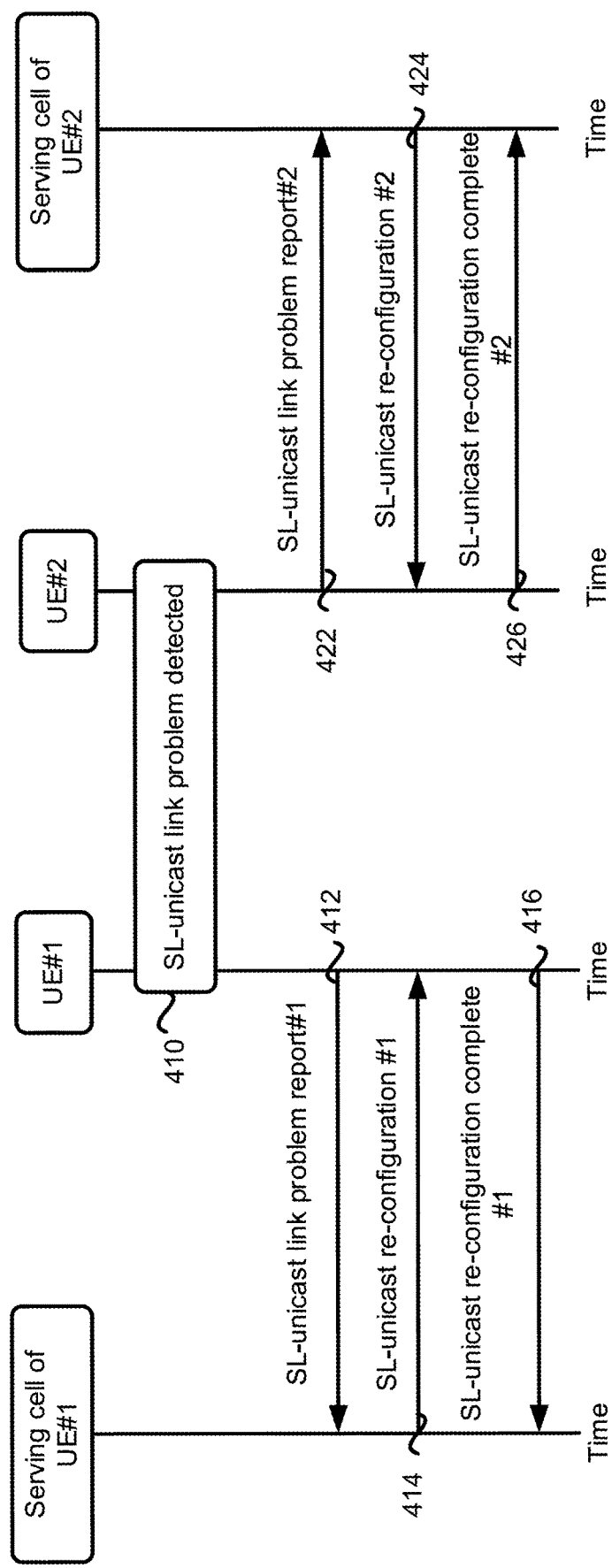
FIG. 4 is a schematic diagram illustrating sidelink unicast re-configuration corresponding to the sidelink unicast link problem report from a serving cell, in accordance with example implementations of the present disclosure.

In addition, the serving RAN may receive the SL-unicast link problem report(s) and then provide the SL-unicast re-configuration procedure. As shown in FIG. 4, an SL-unicast link problem may be detected (e.g., action 410). The UE #1 and/or the UE #2 send an SL-unicast link problem report to the serving cell(s) of UE #1/UE #2 (also note that UE #1 and UE #2 may be served by the same serving cell or different serving cells in the RAN) through the Uu interface (e.g., RRC control signaling) (e.g., actions 412 and 422). The serving cell(s) of the SL-unicast group {UE #1, UE #2} may re-configure the SL-unicast configuration (e.g., remove the component carrier CC #K from the SL-unicast configuration or re-configure the Layer-2/Layer-1 configuration in the PC5 interface associated with the SL-unicast group {UE #1, UE #2}) to its serving UE(s) respectively. It is noted that the serving cell(s) may send the SL-unicast re-configuration message through RRC control signaling on the Uu interface (e.g., actions 414 and 424). In some implementations, there may be a pre-defined maximum time limit (e.g., a systematic requirement to support the SL-unicast re-configuration procedure within a time limit) for the signaling from the detected SL-unicast link problem to the serving RAN receiving the SL-unicast re-configuration complete messages (e.g., actions 416 and 426).

Figure 5:
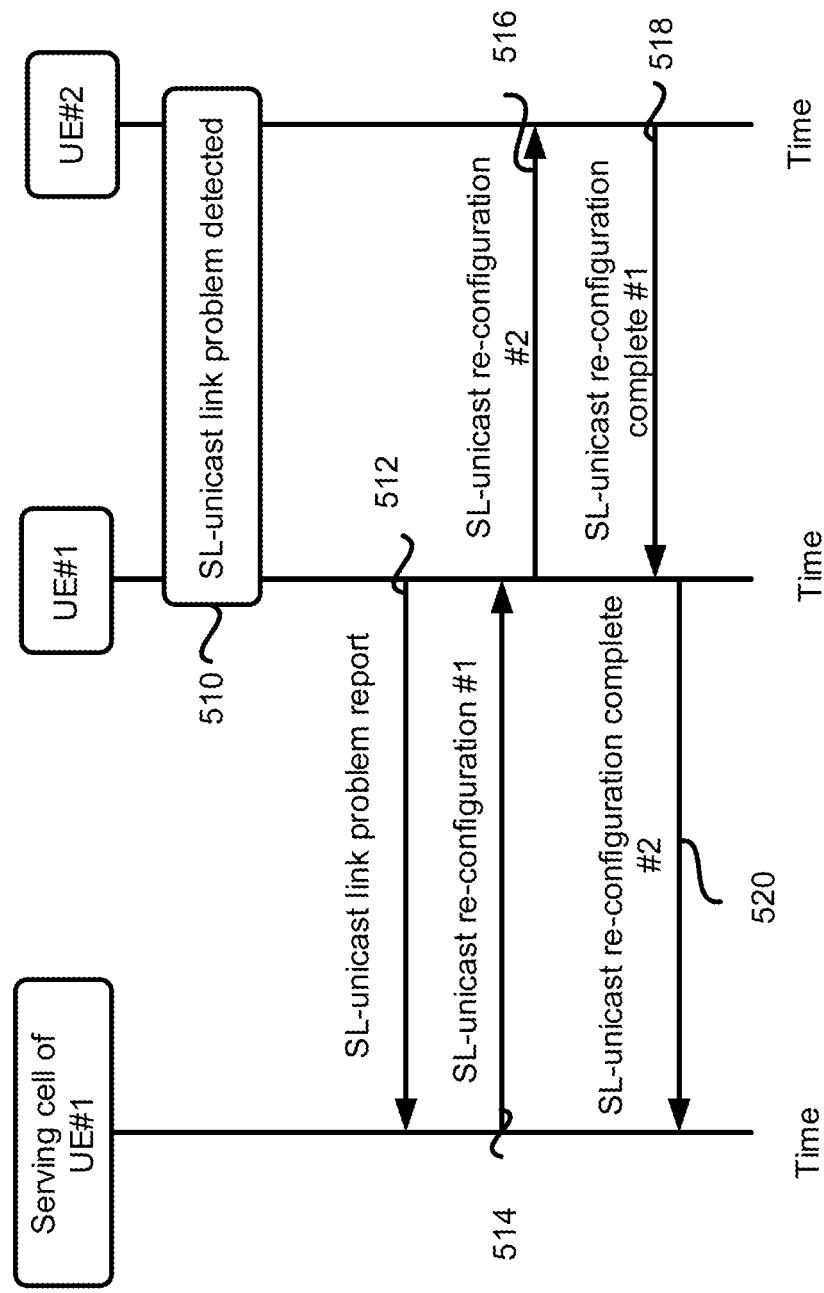
FIG. 5 is a schematic diagram illustrating a UE forwarding a sidelink unicast re-configuration to a paired UE, in accordance with example implementations of the present disclosure.

One of the paired UEs may forward the control signaling from the serving RAN to another UE. With reference to FIG. 5, an SL-unicast link problem may be detected (e.g., action 510). The UE #1 may report the SL-unicast link problem report to the serving RAN (the SL-unicast link problem report may be derived by the UE #1 itself or by an early SL-unicast link problem report transmitted from the UE #2 to the UE #1) (e.g., action 512). Therefore, the serving cell of UE #1 may provide an SL-unicast re-configuration message to the UE #1 (e.g., through the RRC control signaling exchange on the Uu interface) (e.g., action 514). The UE #1 transmits the SL-unicast re-configuration message to the UE #2 based on the SL-unicast configuration which the UE #1 obtains from its serving cell (e.g., action 516). In some implementations, the UE #1 may send an SL-unicast re-configuration complete message to its serving cell only after the UE #1 receives the SL-unicast re-configuration complete message from the UE #2 (e.g., actions 518 and 520), and thus the serving cell of the UE #1 knows that the SL-unicast group {UE #1, UE #2} finishes their SL-unicast re-configuration procedure (e.g., removes CC #K from the operating component carriers of SL-unicast service or re-configures the Layer-2 configuration in the PC5 interface associated with the SL-unicast group {UE #1, UE #2}) for the SL-unicast service(s). In comparison, the UE #1 may not transmit an SL-unicast re-configuration complete message to its serving cell if the UE #1 does not receive the SL-unicast re-configuration complete message from the UE #2.

In some implementations, the serving cell of the UE #1 may multiplex the SL-unicast re-configuration message with other control information in one RRC signaling (e.g., RRC-ConnectionReconfiguration message, RRC Reconfiguration message). The UE #1 may also multiplex the SL-unicast re-configuration complete message with other responses in one RRC signaling (e.g., RRC(Connection)Reconfigura-tionComplete message, RRC(Connection)SetupComplete message, RRC(Connection)ReestablishmentComplete message, or other UL RRC signaling) to the serving cell.

In the SL-unicast failure case, SL-unicast failure occurs when the SL-unicast group {UE #1, UE #2} could not maintain the SL-unicast service with each other. It is noted that the SL-unicast link problem happens while the PC5 interface is still applicable (e.g., by continuing using the SL-unicast pre-configuration stored by the UE #1 and UE #2 respectively), and thus the paired UEs may negotiate with each other (w/wo the relaying of the serving RAN) to solve the problems. In comparison, when the SL-unicast failure event happens, at least one of the paired UEs may consider that PC5 interface is not applicable, and then the UE(s) may report to the upper layers (e.g., V2X application layer) respectively that the PC5 interface is not applicable.

In one implementation, the UE may start a timer after transmitting the SL-unicast configuration (e.g., through the SL-unicast re-configuration message in the PC5 interface) to the paired UE, and then transmit the SL-unicast failure report to its serving cell after the timer expires. In addition, the UE reports to the upper layer that the PC5 interface is non-applicable after the timer expires.

Figure 6:
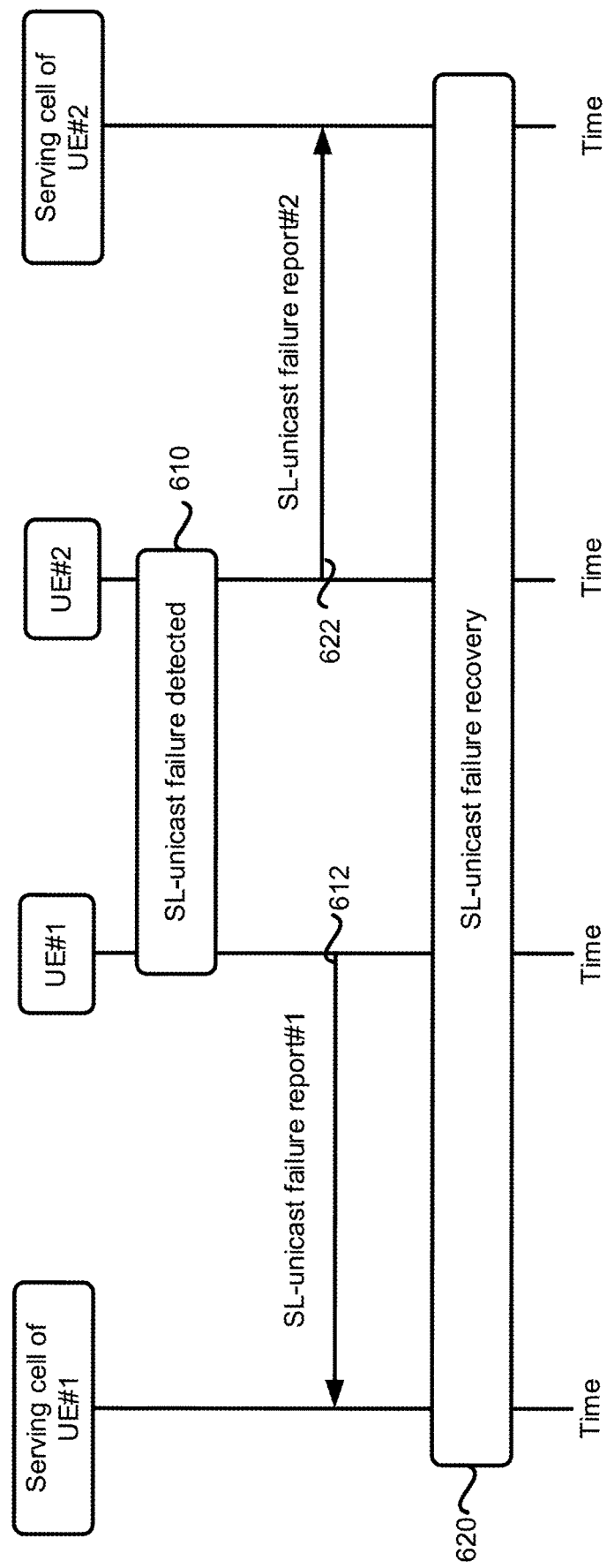
FIG. 6 is a schematic diagram illustrating a sidelink unicast failure event and a corresponding to a sidelink unicast failure recovery procedure, in accordance with example implementations of the present disclosure.

More specifically, the (PC5) AS layer of the UE may report that the SL-unicast service is not applicable to the upper layer (e.g., V2X application layer) when the SL-unicast failure is triggered by one UE (e.g., action 610). In addition, the UE may report the SL-unicast failure to its serving cell (e.g., actions 612 and 622), as shown in FIG. 6. The SL-unicast group {UE #1, UE #2} may be served by the same cell or by different serving cells. It is noted that the UE #1 and UE #2 may observe the SL-unicast failure at different times, so that the paired UEs may trigger the SL-unicast failure independently.

In this case, the SL-unicast group {UE #1, UE #2} may trigger SL-unicast recovery procedure before the UE reports the SL-unicast failure to the upper layer. In other words, the SL-unicast failure may not be reported to the upper layers until the SL-unicast recovery procedure fails. Moreover, the SL-unicast recovery procedure may be triggered by the serving cells of the SL-unicast group {UE #1, UE #2} respectively, so control signaling exchange between the serving cells (e.g., through backhaul or air link connection) may be needed (e.g., action 620).

In some implementations, "AS layer supporting information" may be included in the SL-unicast failure report to the upper layer to inform the condition in the (PC5) AS layer. The SL-unicast failure report may include a cause field of "SL-RLC failure", "Synchronization carrier frequency (re) selection", "Out-of-sync condition on the primary component carrier", "Link problem to the allowed component carrier(s)", "Beyond the maximum communication range for SL-unicast service", "PC5 AS Configuration Failure", and "SL feedback channel failure". Several cases of the above-mentioned cause field are disclosed. Moreover, in the "AS layer supporting information", the indicated cause may be associated with the Layer-2 Destination ID of the corresponding paired UE.

"SL-RLC failure" of the SL-unicast failure report indicates that the maximum number of re-transmissions has been reached (i.e. corresponding to the configured maxRetx-Threshold value to each SL-RB). It is noted that RLC failure may happen to the Uu interface. RLC failure on the Uu interface may not trigger the SL-unicast failure (e.g., while the SL-unicast configuration is provided by SL pre-configuration or broadcasting messages from the serving RAN). In other implementations, RLC failure on the Uu interface may trigger the SL-unicast failure event (e.g., while the SL-unicast configuration is provided by the serving RAN). On the other hand, the SL-RLC failure event may not trigger the radio link failure or Secondary Cell Group Radio Link Failure (SCG RLF) on the Uu interface.

As to "Synchronization carrier frequency (re)selection" of the SL-unicast failure report, the SL-unicast group {UE #1, UE #2} selects one synchronization carrier frequency from a set of given candidate frequencies (e.g., syncFreqList, which may or may not (partially) overlap with the CC #1-CC #K for SL-unicast service) based on the following approaches.

If the UE is synchronized with a Global Navigation Satellite System (GNSS) or cell (e.g., E-UTRA cell/NR cell), the UE may select one frequency from the syncFreqList as the synchronization carrier frequency. In other implementations, if the UE is not synchronized with a GNSS nor a cell, the UE may select candidates of synchronization sources (e.g., SyncRef UE) from the frequencies in the syncFreqList. Thus, the UE may determine the synchronization reference frequency based on the monitoring results of possible SyncRefUE(s) from the frequencies in the syncFreqList. The UE may also determine the synchronization reference frequency based on given rules, which may be pre-defined in the technical standard documents.

However, the selected synchronization source may have problems as listed in Table 2. In this case, the UE may reselect the synchronization source, and also reselect the synchronization carrier frequency by monitoring frequencies from the syncFreqList. Table 2 includes problems that the UE considers as no synchronization carrier frequency is selected.

TABLE 2

| ID | Note |
|---|---|
| Problem#1 | If the UE selects a cell as the synchronization reference source, and the cell cannot fulfill the S criterion (wherein the S criterion may be pre-defined in technical standard, such as 3GPP TS 36.304/TS 38.304). |
| Problem#2 | If the UE selects GNSS as the synchronization reference source, and GNSS is unreliable (e.g., the decision of GNSS reliability may be determined based on the requirement indicated in standard). |
| Problem#3 | If the UE selects a SyncRef UE and the SL-RSRP of the current SyncRef UE is less than the minimum requirement (e.g., the minimum requirement may be configured by the network or being defined by standard). |

Figure 7:
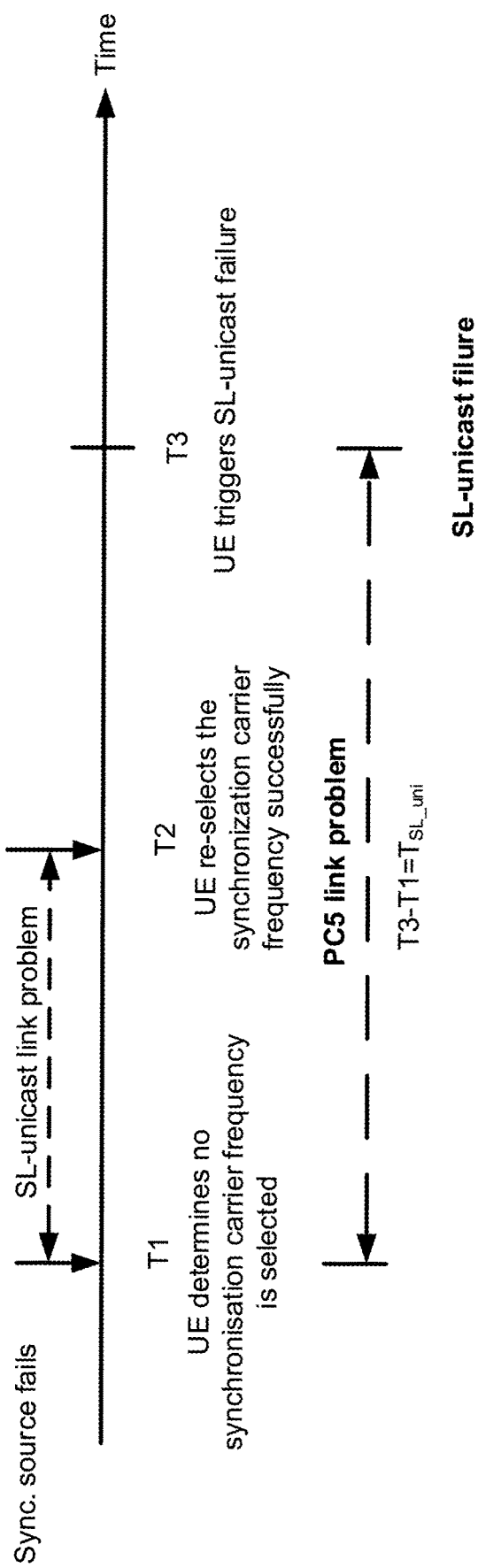
FIG. 7 is a schematic diagram illustrating a sidelink unicast link problem resulting in a sidelink unicast failure, in accordance with example implementations of the present disclosure.

The SL-unicast service may be interrupted while UE needs to re-select synchronization source and synchronization carrier frequency. In this case, the UE itself determines that the SL-unicast link problem happens while the UE determines to (re)select the synchronization carrier frequency (e.g., due to the synchronization source of the UE fails), as shown in FIG. 7. Moreover, the UE may determine that the SL-unicast failure is triggered while the UE still could not identify a suitable synchronization source to maintain the SL-unicast service after the SL-unicast link problem happens for a period of time. For example, the UE determines the SL-unicast failure at T3, where $T3-T1 \geq T_{SL\_uni}$ ($T_{SL\_uni}$ is a given parameter for the UE to determine when to trigger the SL-unicast failure). The UE may start a timer at T1, and trigger the SL-unicast failure while the timer counts to $T_{SL\_uni}$. In one implementation, the SL-unicast service may be continued, and the timer is reset to zero if the UE re-selects the synchronization carrier frequency successfully before the timer reaches $T_{SL\_uni}$ (e.g., at T2). The UE may obtain the value of $T_{SL\_uni}$ ($T_{SL\_uni} \geq 0$) through a SL pre-configuration (stored by UE itself) or control signaling (e.g., dedicated control signaling such as RRC(Connection)Reconfiguration message or common control signaling such as broadcasting system information from the serving cell). In other implementations, the UE may trigger an SL-unicast failure directly if the problem #1-problem #3 in Table 2 occurs and the value of $T_{SL\_uni}=0$.

As to "Out-of-sync condition on the primary component carrier" of the SL-unicast failure report, the SL-unicast failure is triggered even though only the SL-unicast link problem happens to the primary component carrier. In LTE V2X service, the UE may need to find a cell as the synchronization source to each of the configured component carriers CC #1-CC #K, even though the UE may be out of the coverage of the RAN in some of the configured component carriers.

In one implementation, the UE capable of V2X SL communication that is configured by upper layers to transmit V2X SL communication shall use the PCell or PSCell (RRC_CONNECTED) or the serving cell (RRC_IDLE or RRC_INACTIVE) as a reference for synchronization if the frequency is the primary frequency. Or, the UE shall use the corresponding SCell as a reference if the corresponding frequency is a secondary frequency. Or, the UE shall use the DL frequency paired with the frequency used to transmit V2X SL communication as a reference if the UE is in coverage of the corresponding frequency. In other implementations, the UE shall use the PCell (in RRC_CONNECTED) or the serving cell (in RRC_IDLE/RRC_INACTIVE), which may not operate on the corresponding frequency of the target V2X service(s), as a reference, if needed and the UE is out of coverage on the corresponding frequency.

When the corresponding frequency which has an air link problem (as shown in Table 1) is the primary frequency to the UE, the RRC Connected UE may trigger SL-unicast failure if a connection between the UE and the PCell is disconnected (e.g., radio link failure event or SCG radio link failure event happens). The SL-unicast failure may be triggered regardless of whether the UE has selected an SCell as the synchronization source in the corresponding component carrier. This may happen when the SL-unicast configuration is provided by the serving RAN, and thus the UE may not maintain the SL-unicast service based on the SL-unicast configurations from the serving RAN.

In other implementations, the corresponding frequency is the primary frequency to the UE and it is the only synchronization source to the UE. In this case, if the UE has a PCell (or PSCell) operating on the component carrier CC #1 as the synchronization source and the UE is out of the coverage of the RAN on the component carriers CC #2-CC #K, the UE may apply SL-unicast communication based on the DL timing reference from the PCell as the reference for SL-unicast across the component carriers CC #1-CC #K. On the other hand, the UE in RRC_IDLE (or RRC_INACTIVE) may have a serving cell on the dominant frequency carrier (e.g., the component carrier CC #1) and the UE is out of the coverage of the RAN on other component carriers CC #2-CC #K. In this implementation, the UE would trigger SL-unicast failure if the UE could not keep receiving the DL reference timing from the PCell/serving cell on the dominant frequency carrier.

As to "Link problem to the allowed component carrier(s)" of the SL-unicast failure report, each SL-RB may be configured with "allowed component carriers" in the SL-unicast configuration, as shown in Table 2. Therefore, the UE may determine which SL packets of the corresponding SL-RB is transmitted on which one component carrier while the UE receives SL grant or SL resource pools configuration on the corresponding component carrier. One primary path may be indicated for the SL-RB, so that the SL packets of the corresponding SL-RB is transmitted only on the primary path if the SL packet duplication function for the SL-RB is not activated (e.g., being activated by PC5/Uu RRC signaling, Downlink Control Information (DCI) (Uu interface), Sidelink Control Information (SCI), MAC Control Element on Uu interface, or Information Elements (IEs) on the SL packets transmitted through a PSSCH). In contrast, the SL packets of the corresponding SL-RB are transmitted on all of the configured "allowed component carriers" if the SL packet duplication function for the SL-RB is activated. Table 3 includes one SL-RB configured with "allowed component carrier".

TABLE 3

| SL-RB configuration | "AllowedComponentCarrier" |
| --- | --- |
| SL-RB#1 | {CC#1 (Primary path), CC#2, CC#K} |
| SL-RB#2 | {CC#1, CC#5 (Primary path)} |
| SL-RB#3 | {CC#1, CC#2, CC#3 (primary path)} |

In one implementation, the UE may trigger SL-unicast failure if each "AllowedComponentCarrier" for one configured SL-RB have an SL-unicast link problem (as shown in Table 1). In some implementations, the UE may trigger SL-unicast failure if there is one (e.g., the primary path of the one configured SL-RB) or more of the allowed component carriers in at least one SL-RB that has an SL-unicast link problem (as shown in Table 1). The UE may transmit SL packets of one SL-RB only on the primary path (so the non-primary paths may be disabled). Thus, when the SL-unicast problem happens to the primary path, the UE may enable the non-primary paths automatically while the SL-unicast link problem report is triggered (due to the problems provided in Table 1).

As to "Beyond the maximum communication range for SL-unicast service" of the SL-unicast failure report, the maximum communication range for the SL-unicast service is disclosed. The UE may determine the availability of SL-unicast service based on the location-based information of the UEs (e.g., the physical distance between the paired UEs). The maximum communication range ($R_{SL-uni}$) may be provided in the SL pre-configuration or SL-unicast configuration received from the serving RAN or paired UE(s) and the details of the $R_{SL-uni}$ is represented in Table 4. Table 4 includes the definition of the maximum communication range.

TABLE 4

| IE | Definition |
| --- | --- |
| $R_{SL-uni}$ | (1) Maximum communication range for a paired UE (e.g., the SL-unicast group {UE#1, UE#2} in this disclosure) to implement. |

TABLE 4-continued

| IE | Definition |
| --- | --- |
| | (2) In some embodiments, the unit of $R_{SL-uni}$ could be meter (m) and the SL-unicast group {UE#1, UE#2} may estimate the physical distance between each other through the assistance information from other RATs (e.g., NR positioning technique, GNSS, or a mapping table of SL-RSRP value and corresponding distance in one specific frequency range). $R_{SL-uni} \geq 0$. |
| | (3) In some other embodiments, the UEs may estimate the distance between each other based on the received reference signal strengths, which one of the UEs receives from another UE, along with estimated pathloss model. |
| | (4) UE may obtain the value of $R_{SL-uni}$ through the following approaches:<br>a) SL pre-configuration<br>b) Dedicated control signalling from a serving cell (e.g., RRC signalling on Uu interface)<br>c) Common control signalling from a serving cell (e.g., system information broadcasted by the serving cell)<br>d) Dedicated control signalling from another UE (which may or may not be the paired UE of the SL-unicast service) through PC5 RRC signalling.<br>e) Common control signalling from another UE (which may be the paired UE of the SL-unicast service), such as SL -MIB (SL-PBCH) signalling. |

In addition, the SL-unicast failure triggering and SL-unicast link problem reporting designs based on $R_{SL-uni}$ are provided in Table 5.

TABLE 5

| Case | Definition |
| --- | --- |
| Case 1 SL-unicast failure event triggering | (1) If the distance between the SL-unicast group {UE#1, UE#2} is larger than $R_{SL-uni}$ => AS layer reports to upper layer (in the UE side) that SL-unicast failure happens and the SL-unicast service on PC5 interface is not applicable.<br>(2) In some embodiments, the UE (in RRC_CONNECTED state) may be triggered to report the 'SL-unicast failure event' to the serving cell while the distance between the SL-unicast group {UE#1, UE#2} is larger than $R_{SL-uni}$. |
| Case 2 SL-unicast link problem reporting | (1) If the distance between the SL-unicast group {UE#1, UE#2} is larger than $R_{SL-uni}$ => AS layer reports to upper layer (in the UE side) that SL-unicast link problem happens, so the SL-unicast configuration may need to be changed to fulfill the Quality of Service (QoS) requirement of the SL-unicast service. The UE may inform the paired UE or the serving cell that the distance between each other is larger than $R_{SL-uni}$.<br>(2) The SL-unicast group {UE#1, UE#2} may maintain the SL-unicast service by re-configuring the SL-unicast configuration. In some embodiments, both of the SL-unicast group {UE#1, UE#2} may fallback to the SL-unicast pre-configuration directly while the distance between the SL-unicast group {UE#1, UE#2} is larger than $R_{SL-uni}$.<br>(3) The SL -unicast re-configuration procedure may be implemented based on the signaling exchange with the SL-unicast group {UE#1, UE#2}, or through the assistance of the serving RAN/paired UE. (Please refer to the FIGS. 1, 3 and 4) in this disclosure.<br>(4) In some embodiments, the UE (in RRC_CONNECTED state) may be triggered to report the 'SL-unicast link problem' to the serving cell while the distance between the SL-unicast group {UE#1, UE#2} is larger than $R_{SL-uni}$. |

TABLE 5-continued

| Case | Definition |
|---|---|
| Case 3 Distance-based SL-unicast configuration | In this case, different SL-unicast configuration may be provided with different ranges of distance. |

| Distance | SL-unicast configuration |
|---|---|
| Distance ≤ $R_{SL-uni\_1}$ | SL-unicast config. # 1 |
| $R_{SL-uni\_1}$ < Distance ≤ $R_{SL-uni\_2}$ | SL-unicast config. #2 |
| $R_{SL-uni\_2}$ < Distance ≤ $R_{SL-uni\_3}$ | SL-unicast config. #3 |
| Where in $R_{SL-uni\_1} \geq 0$; $R_{SL-uni\_2} \geq 0$; $R_{SL-uni\_3} \geq 0$ | |

The SL-unicast configuration may include:
1) SL-BWP configurations for SL operation on each component carrier {CC#1-CC#K}.
2) SL-RB configurations on SDAP/PDCP/RCL/MAC/PHY sublayers of PC5 interface accordingly.
The SL- Hybrid Automatic Repeat Request (HARQ) configuration based on distance is provided:
In SL-HARQ procedure, there are three options about SL HARQ-Not Acknowledge (NACK)/ACK message transmission:
Option 0: Receiving UE (of one SL packet) does not transmit HARQ-NACK/ACK response to the transmitting UE (of one SL packet). The Option 0 may be configured in the SL-unicast config. #3.
Option 1: Receiving UE transmits HARQ-NACK on PSFCH if it fails to decode the corresponding Transport Block (TB) after decoding the associated PSCCH. The UE does not transmit feedback (HARQ-ACK) signal on PSFCH if the UE decodes the corresponding TB successfully. Option 1 may be configured in the SL-unicast config. #2.
Option 2: Receiving UE transmits HARQ-ACK on PSFCH if it successfully decodes the corresponding TB. It transmits HARQ-NACK on PSFCH if it does not successfully decode the corresponding TB after decoding the associated PSCCH which targets the receiving UE. Option 2 may be configured in the SL-unicast config. #1.
The Distance-based SL-unicast configurations may be different with each associated operating component carrier.

It is noted that the distance between the paired UEs may be the mapping result of SL-RSRP measurement (e.g., by measuring the SL-SSB or SL CSI-RS or SL DMRS of the corresponding paired UE) based on a pre-defined mapping formula. In addition, the pre-defined mapping formula is based on a specific frequency band (e.g., component carrier(s) in the frequency range (FR) FR 1 or FR2). The UE estimates the distance according to the SL measurement results among the operating component carriers CC #1-CC #K. In some implementations, the UE may estimate the distance with the paired UEs by referring to the mapping results of more component carrier (e.g., linear averaging to different estimated distances among multiple component carriers). In other implementations, the distance between the paired UEs may be determined according to other RATs (e.g., GNSS and NR positioning).

As to "SL feedback channel failure" of the SL-unicast failure report, failure of SL feedback channel is disclosed. An SL feedback channel (e.g., PSFCH) may be configured for the SL-unicast group {UE #1, UE #2} within a subset of component carriers CC #1-CC #K. In this case, one UE may provide feedback information (e.g., HARQ ACK/NACK message of SL packets transmitted on the component carriers CC #1-CC #K, and/or SL channel measurement report) to the paired UE, to maintain the SL-unicast service.

The QoS requirement of the SL-unicast service may be damaged if no applicable PSFCH is between the SL-unicast group {UE #1, UE #2}. Thus, the UE may trigger SL-unicast failure if the link problem happens (as shown in Table 1) on at least one of the component carriers which are configured with an SL feedback channel.

In addition, an SL-unicast configuration fallback mechanism is disclosed. Different SL-unicast configurations may be applied to the paired UEs while SL-unicast failure happens. As shown in Table 6, the SL-unicast group {UE #1, UE #2} may be pre-configured with an SL-unicast pre-configuration. Thus, the SL-unicast group {UE #1, UE #2} may obtain the SL-unicast configuration after (or while) a SL-unicast group is formulated (e.g., through the direct control signaling between the SL-unicast group {UE #1, UE #2}, or through the assistance of the RAN or relaying UE, as shown in FIGS. 1, 3, 4 and 5). Table 6 includes SL-unicast configurations stored in the SL-unicast group {UE #1, UE #2}.

TABLE 6

| SL-unicast configuration | Note |
|---|---|
| SL-unicast pre-configuration | (1) the SL-unicast group {UE#1, UE#2} obtains SL-unicast pre-configuration of an SL pre-configuration.<br>(2) The SL-unicast pre-configuration may include:<br>  a) Pre-configuration for SL-RBs, which includes the pre-configurations of SDAP/PDCP/RLC/MAC/PHY layers on the PC5 interface.<br>  b) SL-BWP configurations for SL operation on each of the component carriers CC#1-CC#K. |
| SL-unicast configuration | (1) the SL-unicast group {UE#1, UE#2} obtains an SL-unicast configuration based after or while a SL-unicast group is formulated.<br>(2) The SL-unicast configuration may include:<br>  a) Configuration for SL-RBs, which includes the pre-configurations of SDAP/PDCP/RLC/MAC/PHY layers on PC5 interface.<br>  b) SL-BWP configurations for SL operation on each component carrier {CC#1-CC#K}. |

Figure 8:
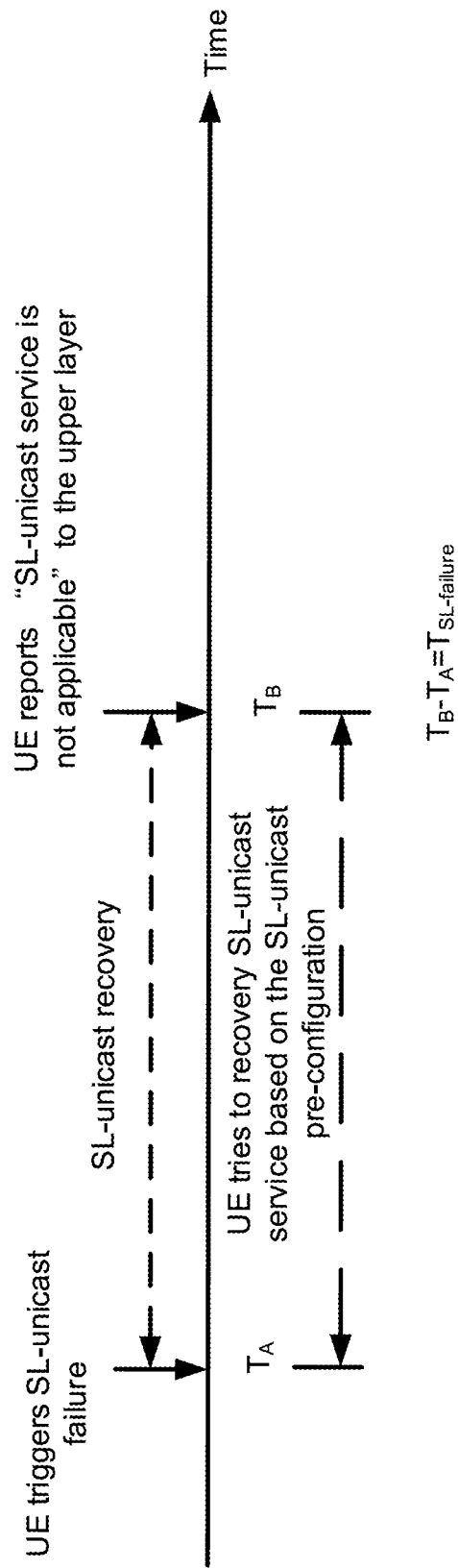
FIG. 8 is a schematic diagram illustrating a sidelink unicast failure recovery procedure, in accordance with example implementations of the present disclosure.

With reference to FIG. 8, the SL-unicast group {UE #1, UE #2} may implement an SL-unicast configuration to exchange SL packets on the PC5 interface. The UE may start the SL-unicast recovery procedure by applying the SL-unicast pre-configuration when the UE detects SL-unicast failure (e.g., at ($T_A$)). The SL-unicast configuration (or part of the SL-unicast configuration) may be replaced with the corresponding configurations in the SL-unicast pre-configuration. It is noted that the SL-unicast group {UE #1, UE #2} may start the SL-unicast recovery procedure at different times since the SL-unicast group {UE #1, UE #2} may trigger the SL-unicast failure at different times.

As shown in FIG. 8, the UE tries to recover the SL-unicast service based on the SL-unicast pre-configuration (or part of SL-unicast pre-configuration and SL-unicast configuration) until a timer ($T_{SL-failure}$) expires. The timer is stopped if the SL-unicast service is kept with the SL-unicast pre-configuration. Otherwise, (e.g., the SL-unicast service could not be resumed based on the SL-unicast pre-configuration), the timer keeps counting until the timer expires. After the timer expires, the UE stops the SL-unicast recovery procedure and then reports to the upper layer that the SL-unicast service is not applicable.

Figure 9:
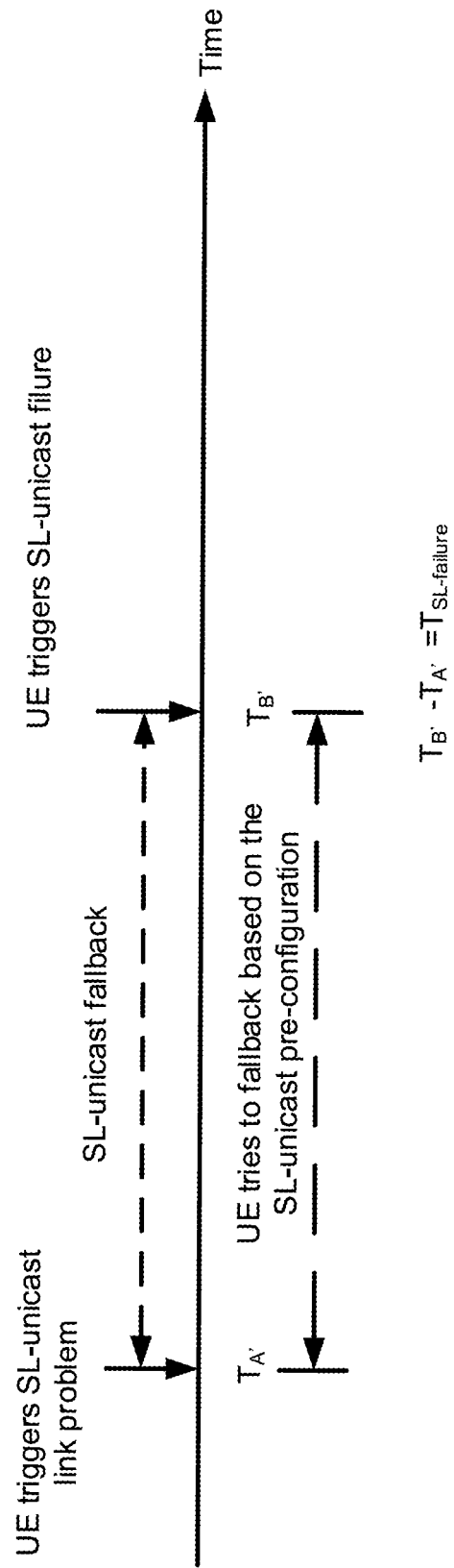
FIG. 9 is a schematic diagram illustrating a sidelink unicast fallback procedure, in accordance with example implementations of the present disclosure.

It is noted that the abovementioned SL-unicast configuration mechanism may also be applied to the SL-unicast link problem scenario. As shown in FIG. 9, one of the SL-unicast group {UE #1, UE #2} (e.g., the UE #1) may detect the SL-unicast link problem with another UE. Then, the UE #1 may trigger the SL-unicast fallback procedure by applying the SL-unicast pre-configuration (or replacing part of the SL-unicast configuration by the corresponding part in the SL-unicast pre-configuration), to try to connect with the paired UE (e.g., the UE #2). In addition, the UE may try to fallback the SL-unicast service based on the SL-unicast pre-configuration until the timer ($T_{SL\text{-}failure} \geq 0$) expires. The UE tries to keep the SL-unicast service based on the SL-unicast pre-configuration and the timer is stopped if the SL-unicast service is kept based on the SL-unicast pre-configuration. Otherwise (e.g., the SL-unicast service could not be resumed based on the SL-unicast pre-configuration), the timer counts until the timer expires. After the timer expires, the UE stops the SL-unicast fallback procedure and then triggers the SL-unicast failure. The UE may directly report to the upper layer that the SL-unicast service is not applicable.

In some implementations, the SL-unicast link problem scenario in FIG. 9 may be initiated while the UE transmits the SL-unicast re-configuration message to the paired UE directly (e.g., referring to FIGS. 3A and 3B, where the UE #1 may transmit the SL-unicast re-configuration message to the UE #2 without indicating the SL-unicast link problem report). Then, after transmitting the SL-unicast re-configuration message, the UE #1 may trigger the SL-unicast fallback procedure by keeping the SL-unicast pre-configuration associated with the UE #2 prior to the transmission of SL-unicast re-configuration message until the timer ($T_{SL\text{-}failure} \geq 0$) expires. The UE would keep the timer counting if no response is received from the UE #2. Also note, while the timer is counting, the UE #2 may reply with an SL-unicast link problem report to the UE #1 and the UE #1 may still keep the PC5 Connection with the UE #2 by continuing using the SL-unicast pre-configuration. In contrast, when the timer expires, the UE may stop the SL-unicast fallback procedure and then trigger the SL-unicast failure. The UE may directly release the SL-unicast pre-configuration associated with UE #2 and then report to the upper layer that the SL-unicast service is not applicable. In addition, the UE may also transmit the SL-unicast failure report to its serving cell when the SL-unicast failure event is detected (referring to the UE #1 in FIG. 6).

In some implementations, a partial SL-unicast configuration mechanism is disclosed. The UE may apply the SL-unicast fallback procedure to the component carriers when the SL-unicast link problem is detected. The other operating component carriers may not be impacted, so that the UEs can apply SL-unicast configuration on those operating component carriers where the SL-unicast link problem is not detected.

The SL-unicast configuration/SL-unicast pre-configuration may include the following configurations (e.g., SL-RB configuration and SL-BWP configuration), as shown in Table 7.

TABLE 7

| SL-unicast configuration | |
|---|---|
| V2X Unicast Service Index | (1) In some implementations, one UE may be configured with one SL-unicast configuration associated with one V2X service, which is indicated by the V2X Unicast Service Index.<br>(2) In addition, the paired UEs (e.g., the SL-unicast group {UE#1, UE#2}) may be configured with more SL-unicast configuration with different V2X Unicast Services between the SL-unicast group {UE#1, UE#2}. Different SL-unicast configurations may be associated with different Layer-2 UE IDs (e.g., the Layer-2 Source (UE) ID and/or Layer-2 Destination (UE) ID). |
| UE ID | The UE ID for this UE itself associated with the corresponding V2X Unicast Service Index. (e.g., Layer-2 Source ID to the UE itself). |
| Peer UE ID | The UE ID of the peer UE (e.g., Layer-2 Destination ID to the paired UE in the SL-unicast group) for the corresponding V2X Unicast Service Index. |
| Operating Component Carrier(s) | The list of Component Carrier ID(s) (e.g., NR-ARFCNs (Absolute radio-frequency channel number), which is configured for the corresponding V2X Unicast Service. In some implementations, one operating component carrier may be configured to support more V2X Unicast Service. |
| SL-RB configuration | One or more SL-RB would be provided in this IE to support the indicated V2X Unicast service. |
| SL-BWP configuration | SL-BWP configuration in each operating component carrier to support the indicated V2X Unicast service. One or more SL-BWP configuration may be configured to one operating component carrier. |

More specifically, the SL-RB configuration includes at least one of SL-RB type, SL-RB ID, SL-QoS Association, SL-SDAP configuration, SL-PDCP configuration, SL-Security configuration, SL-RLC Configuration, and SL-MAC-LogicalChannelConfiguration. The SL-BWP configuration for each component carrier CC #1-CC #K includes configurations as provided in Table 8.

TABLE 8

| SL-BWP configuration | |
|---|---|
| Operating Component Carrier | The frequency location of the SL-BWP, which may be presented by NR-ARFCN or E-UTRA-ARFCN. |
| SL-BWP-ID | An identifier to indicate the corresponding SL-BWP. |
| SL-numerology | In some of the embodiments, the SL-numerology may include the following settings which would be applied to all of the physical channels in the SL-BWP:<br>(1) CP (cyclic prefix) length<br>(2) Channel coding<br>(3) Subcarrier spacing |

TABLE 8-continued

| SL-BWP configuration | |
|---|---|
| Initial SL-BWP | (1) In some implementations, a pre-configured SL-BWP configuration may be provided in the SL pre-configuration and it may be determined as the initial SL-BWP.<br>(2) In some other implementation, an initial SL-BWP configuration may be broadcasted by the serving cell(s) (e.g., through system information).<br>(3) In some additional embodiments, an initial SL-BWP configuration may be provided by the serving cell(s) through dedicated control signaling (e.g., through RRC control signaling in Uu interface). |
| default SL-BWP | (1) In some implementations, a UE may be configured with a default SL-BWP configuration by its serving cell (e.g., through dedicated control signalling or broadcasting system information).<br>(2) In some other implementations, UE may determine the initial SL-BWP as the default SL-BWP (automatically) if there is no indication about default SL-BWP.<br>(3) UE may move to the default SL-BWP automatically in some implementations (e.g., if there is no valid SL-BWP or after a pre-defined timer expires). |
| PSCCH configuration | Indicates the configuration of PSCCH in the corresponding SL-BWP, such as:<br>(1) Locations (in time domain and frequency domain) of corresponding Physical Resource Blocks (PRBs) assigned for the PSCCH. |
| PSSCH configuration | Indicates the configuration of PSSCH in the corresponding SL-BWP, such as:<br>Locations (in time domain and frequency domain) of corresponding PRBs assigned for the PSSCH. |
| PSFCH configuration | Indicates the configuration of PSFCH in the corresponding SL-BWP, such as:<br>Locations (in time domain and frequency domain) of corresponding PRBs assigned for the PSFCH. |
| SL-RS-config | Indicates the SL reference signal configuration in the corresponding SL-BWP.<br>(1) In some implementations, different types of Reference signals may be provided per SL-BWP and so there may be an IE to indicate the RS-type = {Demodulation Reference Signal (DM-RS), Sounding Reference Signal (SRS), Phase-Tracking Reference Signal (PT-RS), AGC (automatic gain control) training signal, sidelink Synchronization Signal Block}. |
| SL-configuredgrant-config | Indicates the NR type 1 or type 2 configured grant configuration in the corresponding SL-BWP (by referring to the NR type 1/type 2 configured grant configuration in the Uu interface). |
| SL-resourcepool-config | Note:<br>(1) A resource pool is a set of time-frequency resources that can be used for SL transmission and/or reception.<br>(2) Multiple resource pools can be (pre) configured to a UE in a SL-BWP.<br>Indicates the configuration of SL resource pools in the corresponding SL-BWP, such as:<br>Locations (in time domain and frequency domain) of corresponding PRBs assigned for each SL-resource pool. |

TABLE 8-continued

| SL-BWP configuration | |
|---|---|
| SL-beamFailureRecoveryConfig | The following configurations may be provided for the SL-beamFailure Recovery procedure. |
| | BeamFailureRecoveryConfig field descriptions |
| | candidateBeamRSList |
| | A list of reference signals (which may be derived by referring to the SL-RS-config) identifying the candidate beams for recovery. The network configures these reference signals to be within the linked SL-BWP in which the BeamFailureRecoveryConfig is provided. SL-rsrp-ThresholdSL-SLRS |
| | Layer-1 SL-RSRP threshold (with the corresponding indicated SL reference signal type) used for determining whether a candidate beam may be used by the UE to recover from SL beam failure. |

Figure 10:
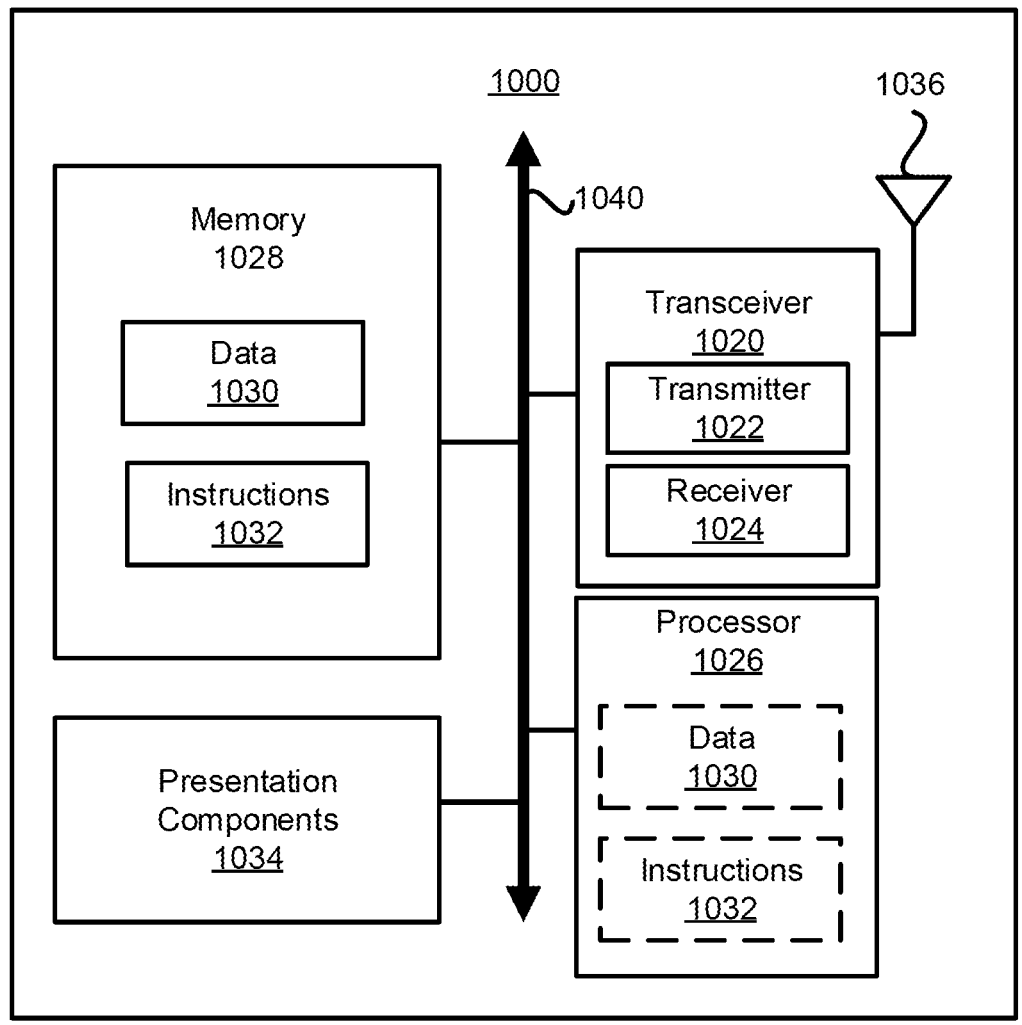
FIG. 10 is a block diagram illustrating a node for wireless communication, in accordance with example implementations of the present disclosure.

FIG. 10 illustrates a node 1000 for wireless communication according to the present disclosure.

As illustrated in FIG. 10, the node 1000 may include a transceiver 1020, a processor 1026, memory 1028, one or more presentation components 1034, and at least one antenna 1036. The node 1000 may also include a Radio Frequency (RF) spectrum band module, a BS communications module, a network communications module, and a system communications management module, input/output (I/O) ports, I/O components, and a power supply (not shown). Each of these components may be in communication with each other, directly or indirectly, over one or more buses 1040. The node 1000 may be a UE or a BS that performs various disclosed functions as illustrated in FIG. 2.

The transceiver 1020 includes a transmitter 1022 (with transmitting circuitry) and a receiver 1024 (with receiving circuitry) and may be configured to transmit and/or receive time and/or frequency resource partitioning information. The transceiver 1020 may be configured to transmit in different types of subframes and slots including, but not limited to, usable, non-usable and flexibly usable subframes and slot formats. The transceiver 1020 may be configured to receive data and control channels.

The node 1000 may include a variety of computer-readable media. Computer-readable media may be any media that can be accessed by the node 1000 and include both volatile and non-volatile media, removable and non-removable media. Computer-readable media may include computer storage media and communication media. Computer storage media includes both volatile and non-volatile, as well as removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not include a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. Communication media includes wired media such as a wired network or direct-wired connection, and wireless media such as acoustic, RF, infrared and other wireless media. Combinations of any of the disclosed media should be included within the scope of computer-readable media.

The memory 1028 may include computer-storage media in the form of volatile and/or non-volatile memory. The memory 1028 may be removable, non-removable, or a combination thereof. Memory includes solid-state memory, hard drives, and optical-disc drives. As illustrated in FIG. 10, the memory 1028 may store computer-readable, computer-executable instructions 1032 (e.g., software codes) that are configured to cause the processor 1026 (e.g., processing circuitry) to perform various disclosed functions. Alternatively, the instructions 1032 may be configured to cause the node 1000 (e.g., when compiled and executed) to perform various disclosed functions.

The processor 1026 may include an intelligent hardware device (e.g., a central processing unit (CPU), a microcontroller, an ASIC, etc.). The processor 1026 may include memory. The processor 1026 may process the data 1030 and the instructions 1032 received from the memory 1028, and information received via the transceiver 1020, the baseband communications module, and/or the network communications module. The processor 1026 may also process information to be sent to the transceiver 1020 for transmission via the antenna 1036, to the network communications module for transmission to a CN.

One or more presentation components 1034 present data to a person or other device. Presentation components 1034 include a display device, speaker, printing component, and vibrating component.

From the previous disclosure, it is evident that various techniques can be utilized for implementing the concepts of the present disclosure without departing from the scope of those concepts. Moreover, while the concepts have been described with specific reference to certain implementations, a person of ordinary skill in the art would recognize that changes can be made in form and detail without departing from the scope of those concepts. As such, the disclosure is to be considered in all respects as illustrative and not restrictive. It should also be understood that the present disclosure is not limited to the particular described implementations, but that many rearrangements, modifications, and substitutions are possible without departing from the scope of the present disclosure.

What is claimed is:

1. A method of sidelink unicast service management in an access stratum layer for a first user equipment (UE), the method comprising:
   receiving, from a second UE, by the first UE through a PC5 interface, a first sidelink unicast configuration associated with the second UE;
   transmitting, by the first UE through a Radio Resource Control (RRC) signaling of the PC5 interface, a sidelink unicast link problem report to the second UE in response to the first UE being unable to comply with all or part of the first sidelink unicast configuration; and
   performing, by the first UE, a sidelink unicast fallback procedure with the second UE by continuously using a second sidelink unicast configuration corresponding with a sidelink unicast pre-configuration used prior to the received first sidelink unicast configuration.

2. The method of claim 1, wherein the sidelink unicast pre-configuration is one of:
   pre-stored in the first UE,
   received from a serving cell of the first UE, and
   received from the second UE prior to the reception of the first sidelink unicast configuration.

3. The method of claim 1, wherein the sidelink unicast pre-configuration includes at least one of sidelink radio bearer configurations, sidelink component carrier configurations, sidelink reference signal configurations and sidelink bandwidth part configurations.

4. A method of sidelink unicast service management in an access stratum layer for a second user equipment (UE), the method comprising:
   transmitting, by the second UE through a PC5 interface, a first sidelink unicast configuration to a first UE;
   receiving, by the second UE through a first Radio Resource Control (RRC) signaling of the PC5 interface, a first sidelink unicast link problem report from the first UE; and
   performing, by the second UE, a sidelink unicast fallback procedure with the first UE by continuously using a second sidelink unicast configuration corresponding with a sidelink unicast pre-configuration used prior to the transmitted first sidelink unicast configuration.

5. The method of claim 4, further comprising:
   transmitting, by the second UE through the first RRC signaling in a Uu interface, to a serving cell of the second UE, a second sidelink unicast link problem report associated with the first UE after receiving the first sidelink unicast link problem report from the first UE.

6. The method of claim 4, further comprising:
   starting a timer, by the second UE, after the second UE transmits the first sidelink unicast configuration to the first UE through the PC5 interface; and
   transmitting, by the second UE through a second RRC signaling in a Uu interface, to a serving cell of the second UE, a sidelink unicast failure report associated with the first UE after the timer expires.

7. The method of claim 6, further comprising:
   reporting, by the second UE, to an upper layer of the second UE that the connection associated with the first UE in the PC5 interface is non-applicable after the timer expires.

8. The method of claim 4, wherein the sidelink unicast pre-configuration is one of:
   pre-stored in the second UE,
   received from from a serving cell of the second UE, and
   received from the first UE prior to the transmission of the first sidelink unicast configuration.

9. The method of claim 4, wherein the sidelink unicast pre-configuration includes at least one of sidelink radio bearer configurations, sidelink component carrier configurations, sidelink reference signal configurations and sidelink bandwidth part configurations.

10. A first user equipment (UE) in a wireless communication system, the first UE comprising:
    a processor for executing computer-executable instructions; and
    a non-transitory machine-readable medium, coupled to the processor, for storing the computer-executable instructions, wherein the computer-executable instructions instruct the processor to:
    receive, from a second UE, by the first UE through a PC5 interface, a first sidelink unicast configuration associated with the second UE;
    transmit, by the first UE through a Radio Resource Control (RRC) signaling of the PC5 interface, a sidelink unicast link problem report to the second UE in response to the first UE being unable to comply with all or part of the first sidelink unicast configuration; and
    perform, by the first UE, a sidelink unicast fallback procedure with the second UE by continuously using a second sidelink unicast configuration corresponding with a sidelink unicast pre-configuration used prior to the received first sidelink unicast configuration.

11. The first UE of claim 10, wherein the sidelink unicast pre-configuration includes at least one of sidelink radio bearer configurations, sidelink component carrier configurations, sidelink reference signal configurations, and sidelink bandwidth part configurations.

12. A second user equipment (UE) in a wireless communication system, the second UE comprising:
    a processor for executing computer-executable instructions; and
    a non-transitory machine-readable medium, coupled to the processor, for storing the computer-executable instructions, wherein the computer-executable instructions instruct the processor to:
    transmit, by the second UE through a PC5 interface, a first sidelink unicast configuration to a first UE;
    receive, by the second UE through a first Radio Resource Control (RRC) signaling of the PC5 interface, a first sidelink unicast link problem report from the first UE; and
    perform, by the second UE, a sidelink unicast fallback procedure with the first UE by continuously using a second sidelink unicast configuration corresponding with a sidelink unicast pre-configuration used prior to the transmitted first sidelink unicast configuration.

13. The second UE of claim 12, wherein the computer-executable instructions further instruct the processor to:
    transmit, by the second UE through the first RRC signaling in a Uu interface, to a serving cell of the second UE, a second sidelink unicast link problem report associated with the first UE after receiving the first sidelink unicast link problem report from the first UE.

14. The second UE of claim 12, wherein the computer-executable instructions further instruct the processor to:
   start a timer, by the second UE, after the second UE transmits the first sidelink unicast configuration to the first UE through the PC5 interface; and
   transmit, by the second UE through a second RRC signaling in a Uu interface, to a serving cell of the second UE, a sidelink unicast failure report associated with the first UE after the timer expires.

15. The second UE of claim 14, wherein the computer-executable instructions further instruct the processor to:
   report, by the second UE, to an upper layer of the second UE that the connection associated with the first UE in the PC5 interface is non-applicable after the timer expires.

* * * * *